United States Patent
Zeigler et al.

[11] Patent Number: 5,130,510
[45] Date of Patent: Jul. 14, 1992

[54] AUTOMATED SHEAR STUD WELDING SYSTEM

[75] Inventors: Andrew Zeigler, Somerville, Mass.; Robert Herschenfeld, Providence, R.I.

[73] Assignee: Massachusetts Institute of Technology, Cambridge, Mass.

[21] Appl. No.: 518,566

[22] Filed: May 3, 1990

[51] Int. Cl.⁵ .................................................. B23K 9/20
[52] U.S. Cl. ............................................. 219/99; 219/98
[58] Field of Search ........................................ 219/98, 99

[56] References Cited

U.S. PATENT DOCUMENTS

| | | | |
|---|---|---|---|
| 3,021,418 | 2/1962 | van den Blink et al. | 219/99 |
| 3,291,958 | 12/1966 | Glorioso | 219/98 |
| 3,448,237 | 6/1969 | Logan | 219/98 |
| 3,551,634 | 12/1970 | Veldgen | 219/98 |
| 3,562,484 | 2/1971 | Murdock | 219/98 |
| 3,579,260 | 5/1971 | Logan | 219/98 |
| 3,809,849 | 5/1974 | Spisak | 219/98 |
| 4,002,876 | 1/1977 | Wieland, Jr. | 219/98 |
| 4,019,013 | 4/1977 | Spisak | 219/98 |
| 4,074,103 | 2/1978 | Shoup et al. | 219/98 |
| 4,315,129 | 2/1982 | Wilkinson et al. | 219/99 |
| 4,420,674 | 12/1983 | Jordan | 219/99 |
| 4,469,928 | 9/1984 | Wilkinson et al. | 219/98 |
| 4,503,310 | 3/1985 | van Loon | 219/98 |
| 4,513,193 | 4/1985 | Ettinger | 219/98 |
| 4,562,328 | 12/1985 | Shoup | 219/98 |
| 4,580,717 | 4/1986 | Lavins et al. | 228/232 |
| 4,669,742 | 6/1987 | Broszukat | 279/41 |
| 4,792,655 | 12/1988 | Ettinger | 219/98 |
| 4,804,811 | 2/1989 | Raycher et al. | 219/98 |

FOREIGN PATENT DOCUMENTS 59-141379  2/1983  Japan .

Primary Examiner—Clifford C. Shaw

[57] ABSTRACT

A welding apparatus welds shear studs onto a horizontal surface and uses ferrules as weld molds. The apparatus includes a weld module having a frame and having a welding gun with a chuck, the module being translatably mounted to a carriage, a holder mounted on the frame which holds a stud in a first position and a ferrule in a second position, and a driver which drives the weld module downward so that the chuck contacts the stud and drives a lower portion of the stud into the ferrule.

30 Claims, 12 Drawing Sheets

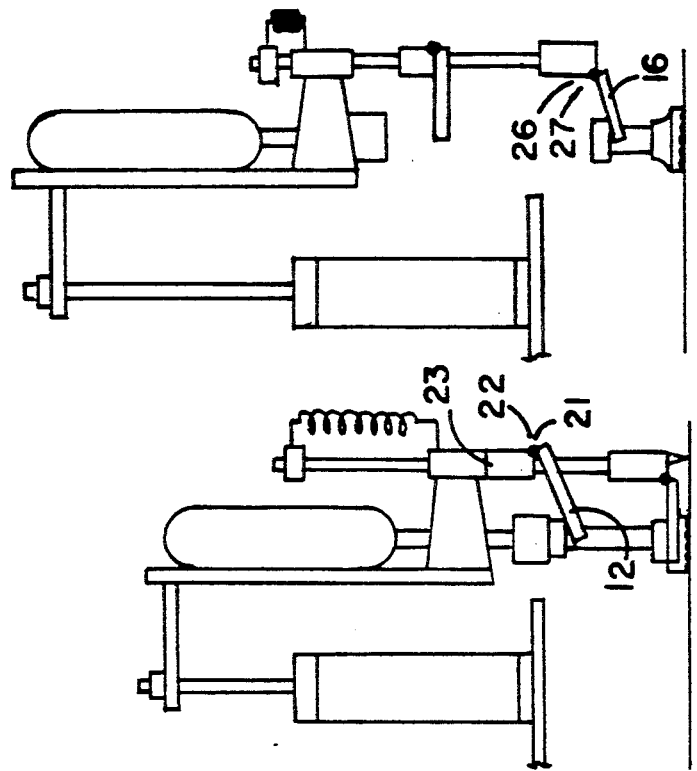

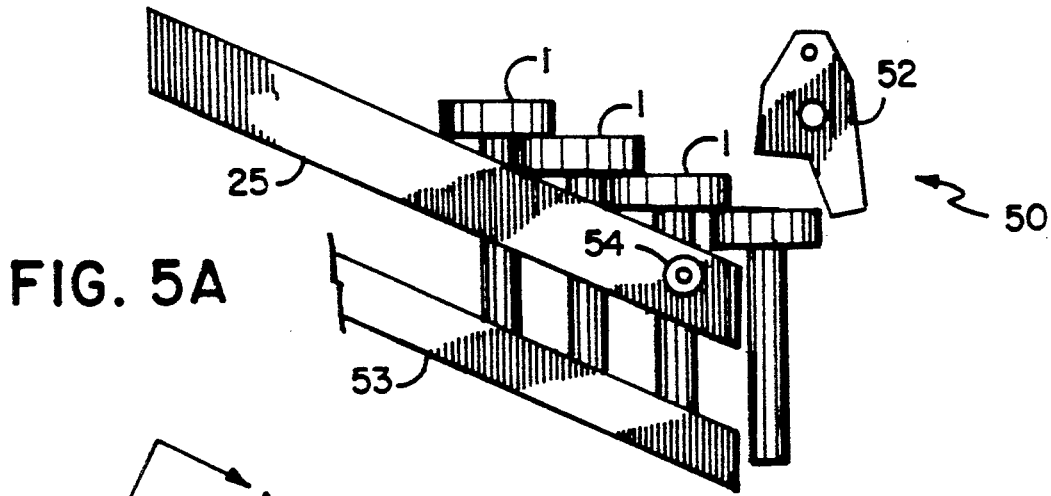
FIG. 5A
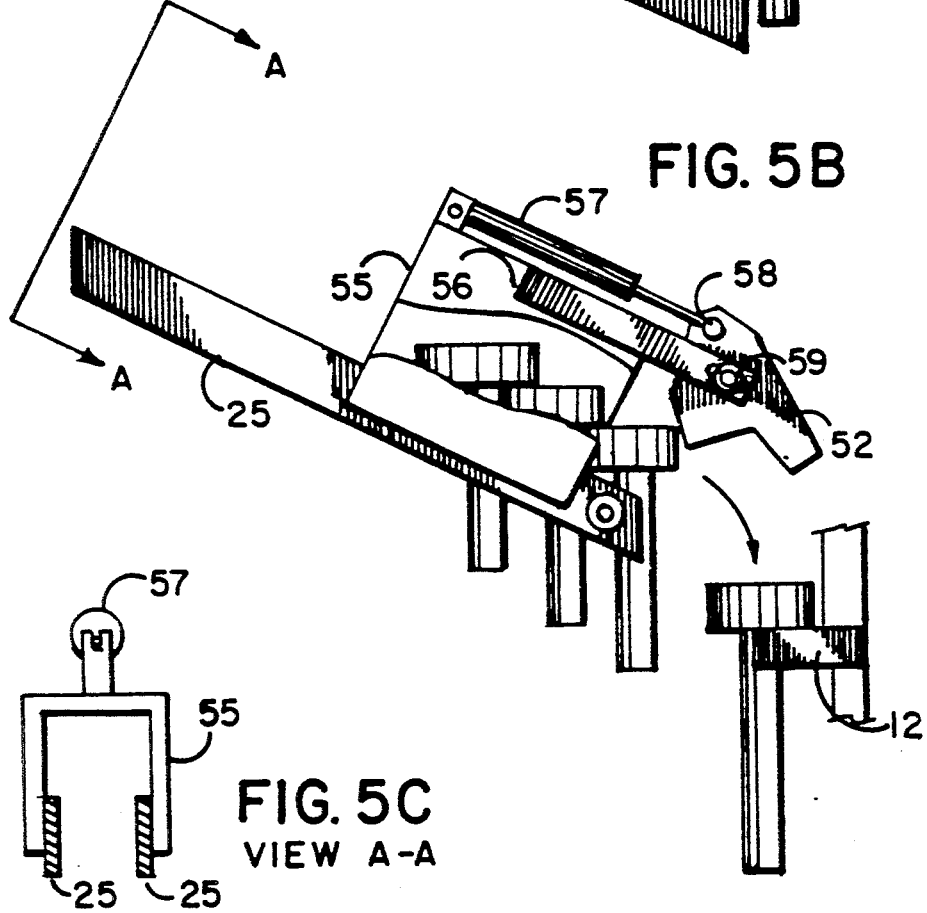
FIG. 5B
FIG. 5C
VIEW A-A
FIG. 5D

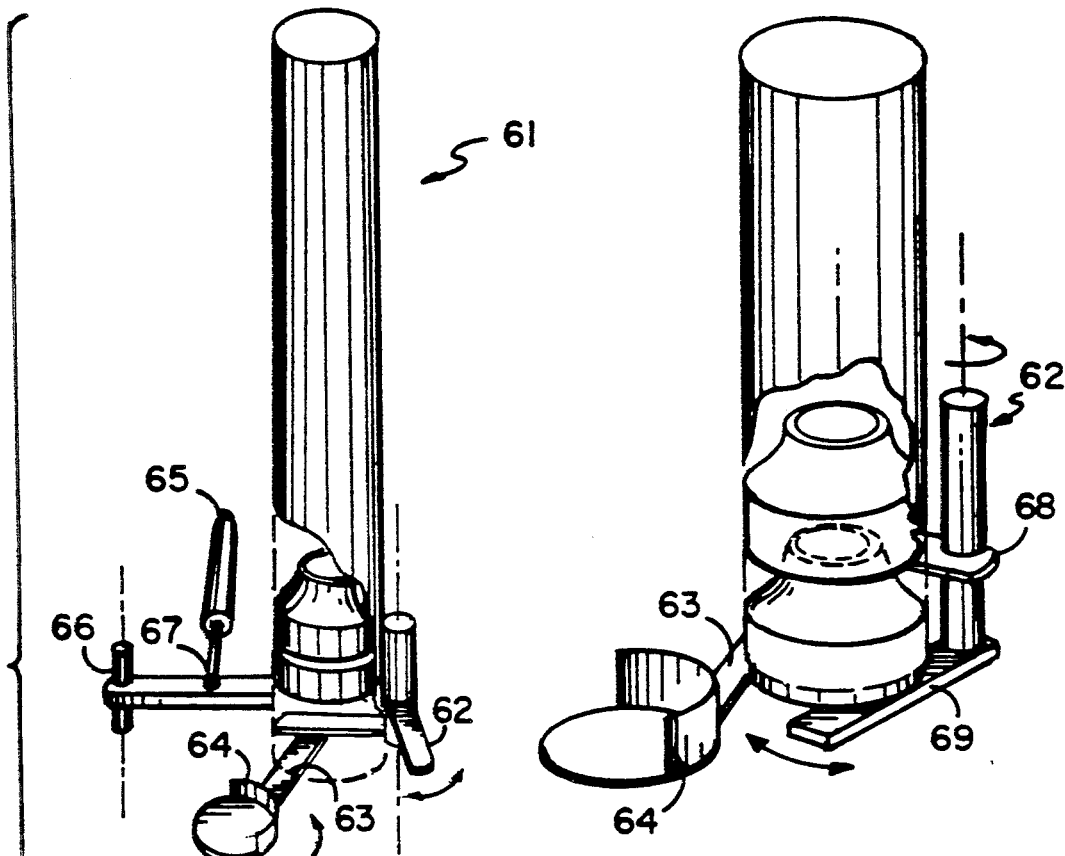
FIG. 6B
FIG. 6A
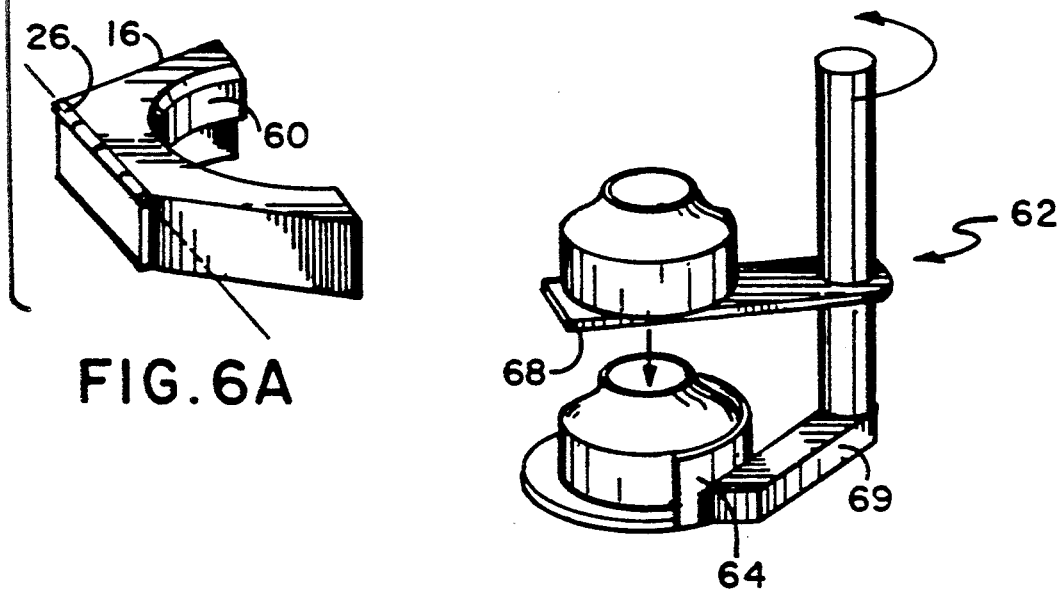
FIG. 6C

5,130,510

AUTOMATED SHEAR STUD WELDING SYSTEM

STATEMENT OF GOVERNMENT INTEREST

The United States Government has rights in this invention pursuant to contract Numbers DAAL-03-87-K0005 and DAAL-03-86-G0197 awarded by the Department of the Army.

TECHNICAL FIELD

The present invention applies to methods and apparatus used in the construction of buildings for welding large, headed shear studs onto steel decking with ceramic ferrules used as weld molds.

BACKGROUND ART

Stud welding is widely used in the manufacture of such items as cookware, heavy machinery and furniture. Studs are available in a variety of shapes and sizes, ranging from one quarter inch long with a threaded end to one foot long, smooth, and hollow. Most studs are cylindrical to simplify handling and each stud is welded by its tip to a parent metal with an electric welding process which uses the stud itself as an electrode.

Since the advent of the stud welding gun in the late 1950's, the use of the headed shear studs in building and bridge deck construction has become widespread. Typically 10,000 to 200,000 studs are used at a single location. The type of stud is shown in FIG. 2A. It is a bolt-like piece of metal, usually about five inches long and ¾ inch in diameter, with a head that is about 1¼ inch in diameter. Studs are welded through preformed corrugated steel decking to underlying steel substructures, typically I-beams, with ferrules, small ceramic rings, acting as weld molds. A ferrule is shown in FIG. 2A. Studs are welded in rows on structural steel decking then concrete is then poured over the studs and the decking, effectively creating a composite structure. FIG. 2B shows a sectional view of the components in a floor of this type. The studs act to prevent the concrete from moving relative to the steel as a result of thermal or mechanical stresses. The concrete works in compression and the steel in tension.

The welding of shear studs in the construction industry is typically done using a hand-held semi-automatic "stud gun" as shown in FIG. 2C. To weld a stud, an operator with a stud gun picks up a stud which has been placed next to the weld site. The operator then loads the stud into the stud chuck, with the tip pointing away from the gun along its centerline. Aligning the protruding stud tip with a ferrule which has been placed directly over the weld site, the operator then threads the stud through the ferrule until both the stud is touching the steel decking, and the end of the stud gun has engaged the ferrule. At this point, the stud and ferrule are ready for welding. Because the gun is resting on the ferrule, its height remains constant through the welding cycle even though the stud, once it is being welded, provides neither support nor reference for the gun. To initiate the weld, the operator pulls a trigger on the gun which closes a circuit in the weld gun controller. When the circuit is closed, current flows through the stud and the stud is lifted by a solenoid in the gun to a prescribed height of about one quarter of an inch, thus creating an arc. The arc, carrying between 1,600 and 2,400 amps melts both the base metal and the tip of the stud. After about one half to three quarters of a second, the welding current in halted and solenoid is deenergized, thus plunging the stud in a pool of molten metal which very rapidly solidifies. The ferrule helps mold the metal around the stud, forming a strong weld. Almost immediately after the stud is plunged back into the base metal, the operator is free to pull the gun away from it and continue on to the next weld site. The actual welding process takes about one second. Typically two workers are involved. One will lay out studs and ferrules where the studs are to be welded and the other will follow with a stud gun and weld them into place. The first worker, in turn, breaks the ferrules away from the studs. A significant amount of time is spent moving equipment and materials from one locale to the next and performing random testing to insure good weld quality. This testing usually means beating sideways (horizontally) on the head of a welded stud with a sledge hammer to see if the stud will or will not break off at the weld.

A great number of automatic stud welding systems are currently in operation in factory environments, welding a vast array of studs. However, none of the systems deal with studs which are headed and as large as the ones used in buildings and bridges. There are several problems associated with feeding large, headed studs into a welding chuck. Vibratory/pneumatic feed systems used in most automatic stud welders do not lend themselves to the inertia and irregular shape of a shear stud. The bulk and weight of such a feed system would be unacceptable in a portable stud welding system. There are no known solutions to the problem of automatic feeding of both studs and ferrules and providing proper positioning for both prior to welding.

There have been earlier attempts at speeding, if not automating, the shear stud welding process. Roughly 20 years ago, the Nelson Stud Welding Company, now a Division of TRW, marketed a device which held 4 stud guns and rolled along an I-beam. The operator manually indexed, loaded and welded the studs. While the machine made accurate, high quality welds, it was slower than a single operator with a single stud gun. The Nelson welding machine used the edge of the I-beam or deck as a guide and was moved along manually by the operator. However, problems arise when there are obstructions such as rebar and concrete forms in place before the stud welding operation commences.

Building decks represent more difficulties in terms of guidance and obstacles. The studs must be welded through decking into underlying beams which often abut vertical structural members. Vertical structural members in a building present periodic obstacles in what otherwise may be a simple, clear path for a stud welder. Corrugations in the decking present further difficulties because the studs are placed and welded in the valleys, while the machine itself must clear the peaks. Another problem is that there may also be a thick layer of a rust inhibitive coating which must be ground away before welding can take place.

DISCLOSURE OF INVENTION

The present invention provides an automated welding apparatus for welding headed shear studs onto weld sites on a substantially horizontal surface, using ferrules as weld molds. The apparatus includes a carriage, translatable along a surface having weld sites; a lift assembly, mounted on the carriage; and a weld module, supported by the lift assembly, having a welding gun and a positioning assembly for holding and positioning a stud and a ferrule. The positioning assembly is mounted for vertical translation relative to the weld module. The lift assembly may lift the weld module away from the horizontal surface to permit translation of the carriage over the surface. The lift assembly may lower the weld module so as to position the ferrule proximate to the weld site. The lift assembly may lower the weld module further so as to bring the welding gun in contact with the head of the stud. The positioning assembly supports the stud yieldingly such that the welding gun may push the stud down until the tip of the stud is within the ferrule.

BRIEF DESCRIPTION OF DRAWINGS

FIG. 2A shows a ferrule and a stud. FIG. 2B shows corrugated decking and shear studs in place. FIG. 2C shows a manual welding system and a welding gun.

FIGS. 4A-4D show the operation of the automatic positioning system.

FIGS. 5A-5D show the stud feed mechanism.

FIGS. 6A-6C show the ferrule feed mechanism.

GENERAL DESCRIPTION OF SPECIFIC EMBODIMENTS

Figure 1:
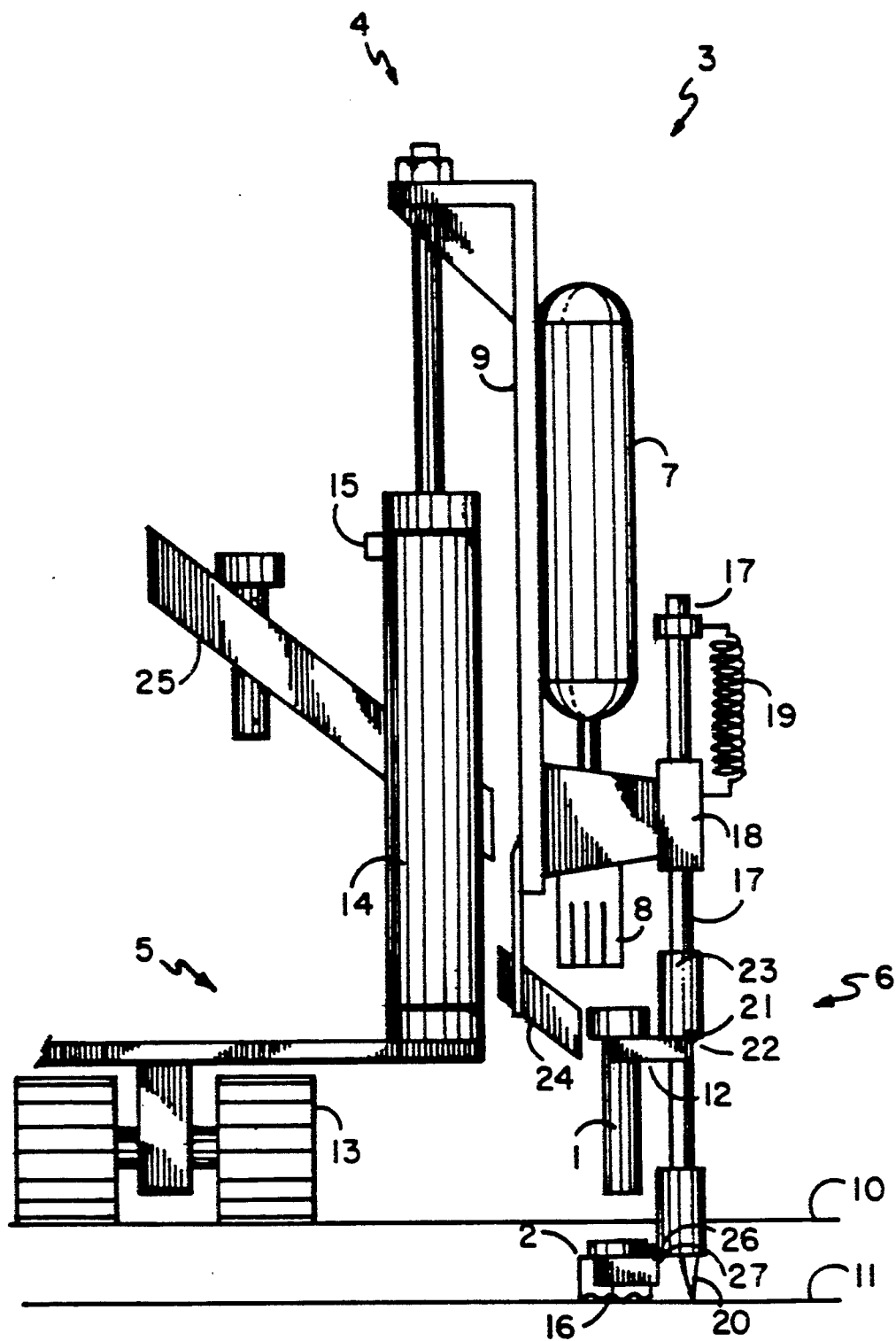
FIG. 1 shows a front elevation of one embodiment of the invention.

A partial front elevation of one embodiment of the invention is shown in FIG. 1. A carriage (5) having tracks (13) rides on surface (10). Mounted on the carriage is a pneumatic cylinder (14). This is the main component of lift system (4) which supports and, as needed, lifts the weld module (3). The welding gun (7) having a chuck (8) is rigidly attached to the weld module frame (9). Slideably attached to this frame is automatic positioning assembly (6) which positions a stud (1) and a ferrule (2) with respect to a weld site on the decking lower surface (11). FIG. 2B shows the relative positions of the studs welded in position and the decking upper surface (10) and the decking lower surface (11). Returning now to FIG. 1, the automatic positioning assembly (6) is slideably mounted with respect to the weld module frame (9) by means of slide bearing (18) within which rides slide rail (17). The weight of the automatic positioning assembly is supported by a spring (19) which in a preferred embodiment is a compression spring. The automatic positioning assembly supports a stud (1) on a hinged platform (12). A magnet (23) acting on platform (12) normally provides sufficient force to support the weight of the stud. A rotational spring (21) is used to return the platform to the horizontal position (as shown in FIG. 1) after it has been moved down by the action of the welding gun. At the lower tip of the automatic positioning assembly (6) is a positioning stop (20). Resting against the surface of the lower decking (11), this positioning stop locates the ferrule (2) in ferrule holder (16) around the weld site. The ferrule holder is pivotally mounted by hinge (26) and normally held in horizontal position by rotational spring (27). Position sensor (15) detects when the weld module is in its raised position. Intermediate stud guide rails (24) suspended from the weld module frame are positioned to guide the studs onto the hinged platform. A pair of inclined rails (25) support a plurality of studs. The studs slide down the inclined rails onto the intermediate stud guide rails.

Figure 2A:
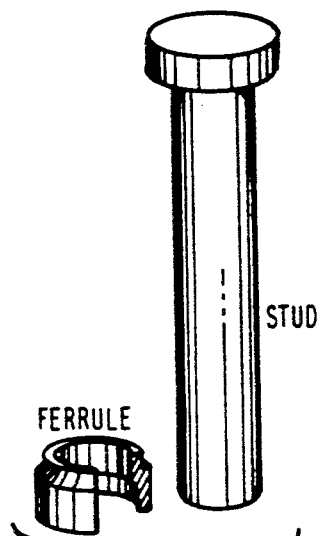
FIGS. 2A-2C show prior art.
Figure 2C:
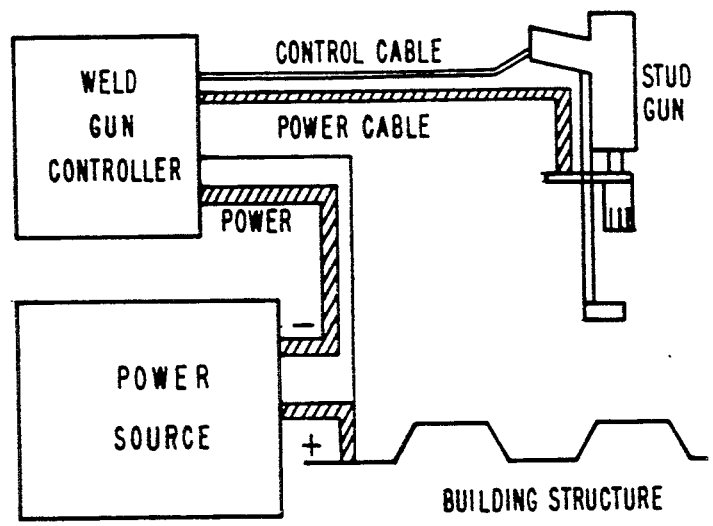
Figure 2B:
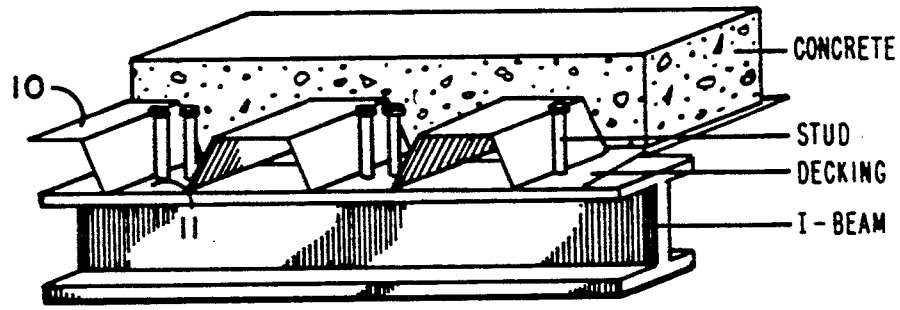

FIG. 2A shows a ferrule and a stud known in the art. FIG. 2B shows the general configuration of a decking structure known in the art and which is to be built using stud welding by means of the present invention. FIG. 2C shows a welding gun assembly known in the art and used in building structure construction.

Figure 3A:
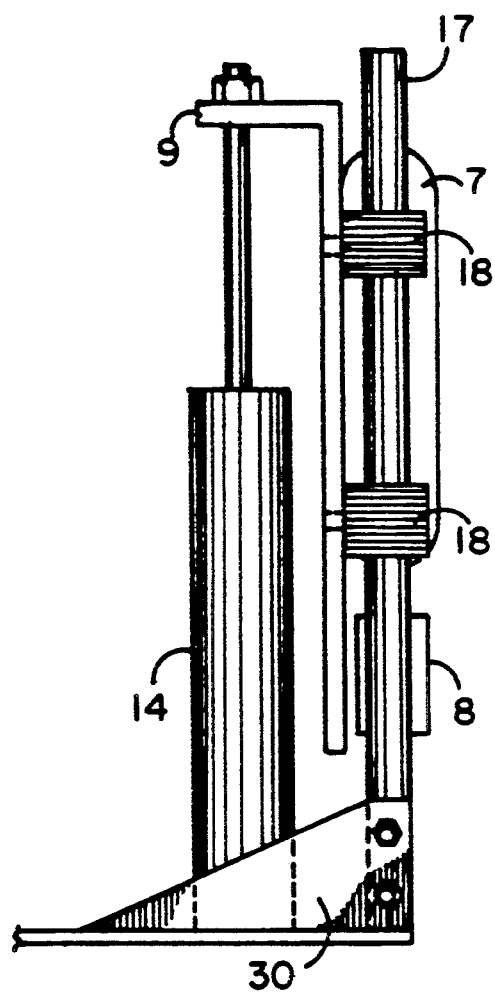
FIG. 3A shows the mounting of the lift system and the weld module.
Figure 3B:
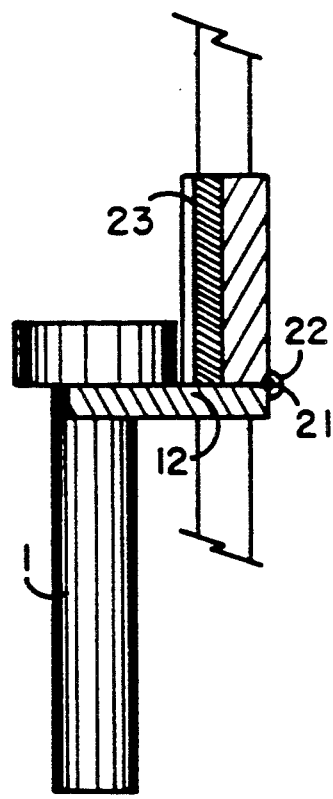
FIG. 3B shows detail of the hinged platform.

Further detail of the mounting of the automatic positioning assembly is shown in FIG. 3A. Specifically, FIG. 3A shows the mounting of slide rail (17) within slide bearings (18) and the manner in which, in a preferred embodiment, slide rail (17) is supported by rail brace (30) on the carriage. FIG. 3B shows detail of the hinged platform (12), hinge (21), rotational spring (22) and magnet (23).

The positioning sequence for a ferrule, a stud and a welding gun is shown in FIGS. 4A-4C. FIG. 4A shows the relative position of the welding gun chuck (8), the stud (1) and the ferrule (2) after the lift means has lowered the positioning assembly and positioning stop (20) is touching lower decking (11). At this point in the cycle the ferrule is sitting on the weld site and the stud is immediately above it supported by the hinged platform. In the next operation the lift means pushes the welding gun chuck onto the stud as shown in FIG. 4B. Following that, the lift means further pushes the welding gun chuck against the head of the stud, overcoming the magnetic force holding up the platform, until the tip of the stud is inside the ferrule, as shown in FIG. 4C and further downward movement of the weld module is prevented when it contacts a stop on the positioning assembly. With the ferrule, the stud and the welding gun in position for welding, the welding cycle is automatically initiated by conventional welding gun electronic control circuitry. The welding cycle includes lifting the stud a short distance to create an arc gap. Because the weld module is resting on the positioning assembly, the height of the welding gun remains constant through the welding cycle even though the stud, once it is being welded, provides neither support nor reference for the gun. After the stud has been welded in place, the weld module is lifted clear of the stud by pneumatic cylinder (14). After platform (12) has cleared the head of the welded stud, the platform returns to its normal, i.e. horizontal, position by means of spring (22) and is held in position by means of magnet (23). FIG. 4D shows how hinge (26) enables the ferrule holder to clear the head of the welded stud. After the ferrule holder has cleared the head of the stud, it is returned to its normal, horizontal position by means of rotational spring (27).

The stud feed mechanism is shown in FIGS. 5A-5D. FIG. 5A shows a row of studs supported by a pair of inclined rails (25). The bottom stud is restrained by ratchet (52). Also shown in FIG. 5A is a stud tip orientation guide (53) for keeping the studs upright and a stud sensor (54) for detecting when the stud guide rail is empty. Further detail of the ratchet sequencer mechanism is shown in FIG. 5B. A rail bracket (55), supported by the inclined rails, carries a pivot bracket (56) having a pivot (59) about which ratchet (52) may turn. The ratchet is controlled by cylinder (57) via pivot (58). FIG. 5B also shows how the released stud falls onto platform (12). (For simplicity, the intermediate inclined rails are not shown in FIG. 5B.) FIG. 5C shows a partial cross section of the stud feed mechanism. FIG. 5D shows a partial cutaway top view of the stud feed mechanism showing the rails (25), the studs (1) and the sensor (54).

FIGS. 6A–6C show the ferrule feed assembly. FIG. 6A shows the ferrule holder (16), the hinge (26) which supports the ferrule holder and the position of the spring-loaded ferrule-retaining plunger (60). FIG. 6A also shows a vertical tube holding ferrules supported by a ferrule ratchet sequencer (62) and further showing a ferrule delivery scoop (64) on the end of a ferrule delivery arm (63). The ferrule delivery arm is pivoted about pivot (66) which is actuated by pneumatic cylinder (65) operating at pivot (67). The partial cutaway view given in FIG. 6B shows how upper blade (68) releases ferrules one at a time onto lower blade (69). The upper blade moves between adjacent ferrules by virtue of and to the extent of the scalloped cutaway section on top of each ferrule. FIG. 6C shows how lower blade (69) releases ferrules one at a time into ferrule delivery scoop (64) while upper blade (68) restrains the next ferrule. Delivery of a ferrule from the ferrule scoop to the ferrule holder requires that the ferrule holder be vertically positioned with respect to the ferrule scoop. The position of the ferrule scoop is fixed with respect to the platform. Referring to FIG. 1, this vertical positioning is accomplished by means of a stop on the fully up position of the pneumatic cylinder and another stop on the fully up position against the compression spring (19) of positioning assembly (6) and shaft (17). Position sensor (15) detects when the weld module is in its raised position.

Figure 7:
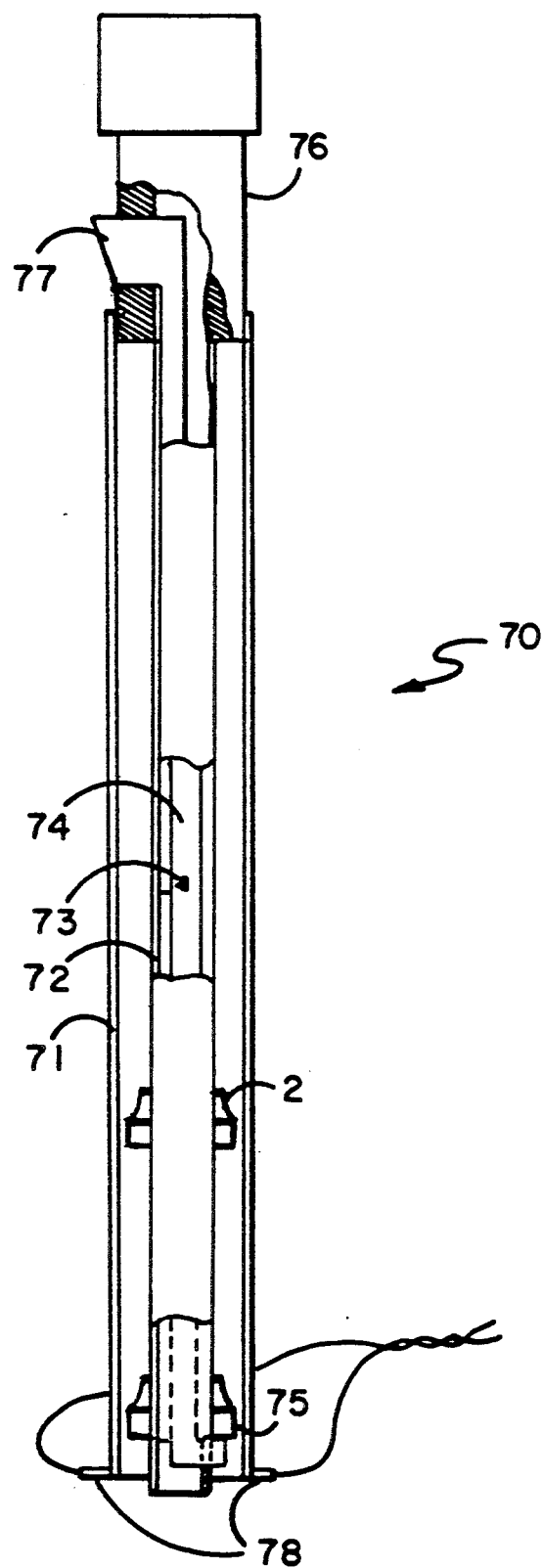
FIG. 7 shows the ferrule stack holder.
Figure 8:
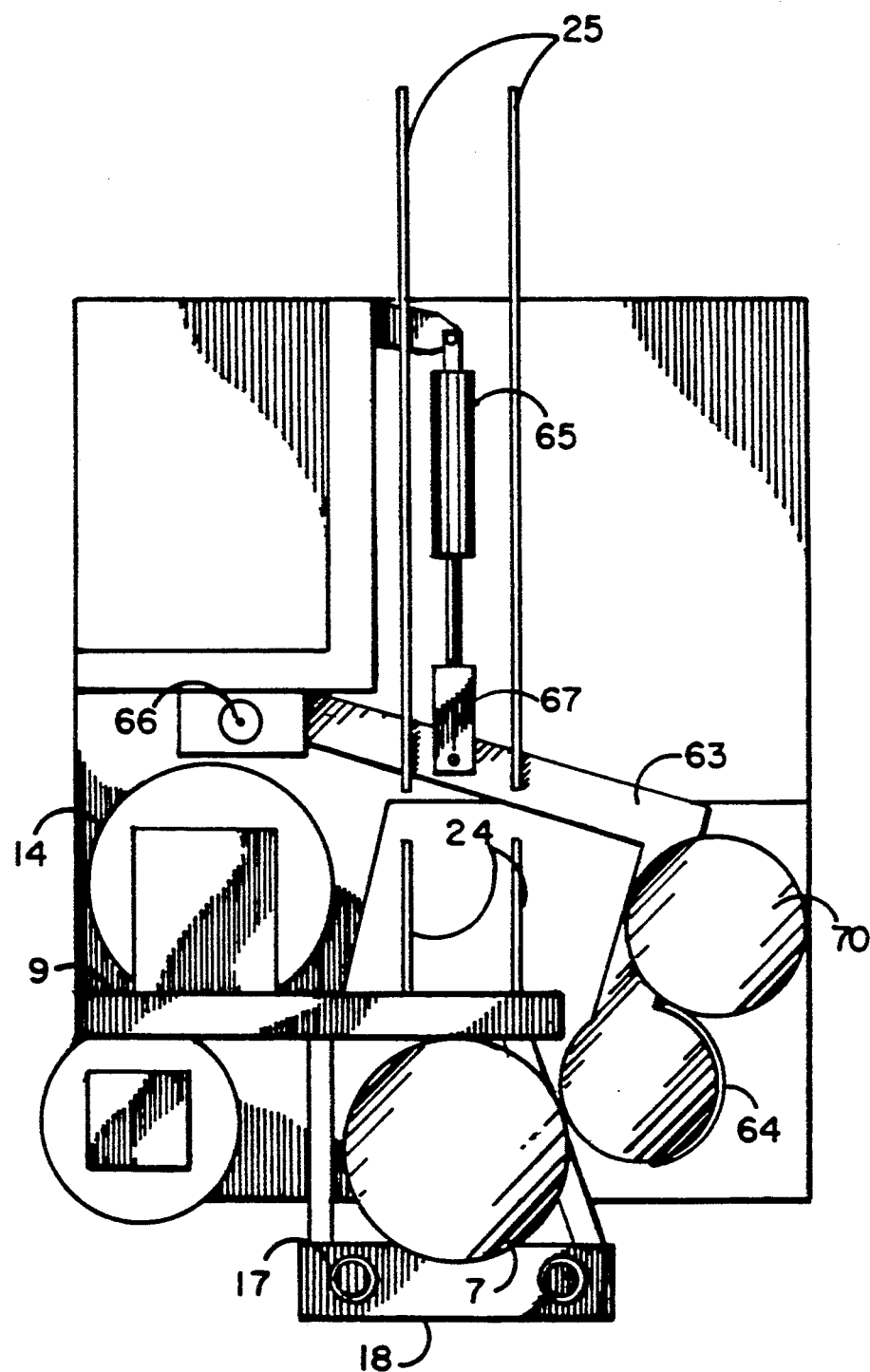
FIG. 8 shows a plan view of an embodiment of the invention having a ferrule feed mechanism and a ferrule stack holder.

The ferrule stack holder is shown in more detail in FIG. 7. FIG. 7 shows an outer vertical tube (71), an inner vertical tube ,72) and a plurality of ferrules (2) sliding down the inner tube. Within the inner tube is a lever (74) pivoted on pivot (73). At the bottom of this lever is a nub (75) which protrudes through a hole in the inner tube such as to support the lowest ferrule. At the top of the lever is a sliding actuation edge (77). The top of the inner cylinder is attached to a header (76). For reloading the ferrule stack holder, the header and the inner tube are extracted from the outer tube and ferrules are threaded onto the inner tube from the lower end. Nub (75) retains the stack of ferrules during transit. When the inner tube with its load of ferrules is inserted into the outer tube and header (76) is pushed right down into the outer tube, sliding actuation edge (77) turns the lever about pivot (73) to withdraw the nub and make ferrules available for delivery. FIG. 7 also shows two ferrule sensors (78) mounted on the lower end of the outer vertical tube (71). In operation, when the ferrule feed mechanism is mounted in the automated stud welding system, these sensors detect an empty ferrule stack. A top view of an embodiment of the present invention which uses a ferrule feed mechanism is shown in FIG. 8.

Figures 9A, 9B:
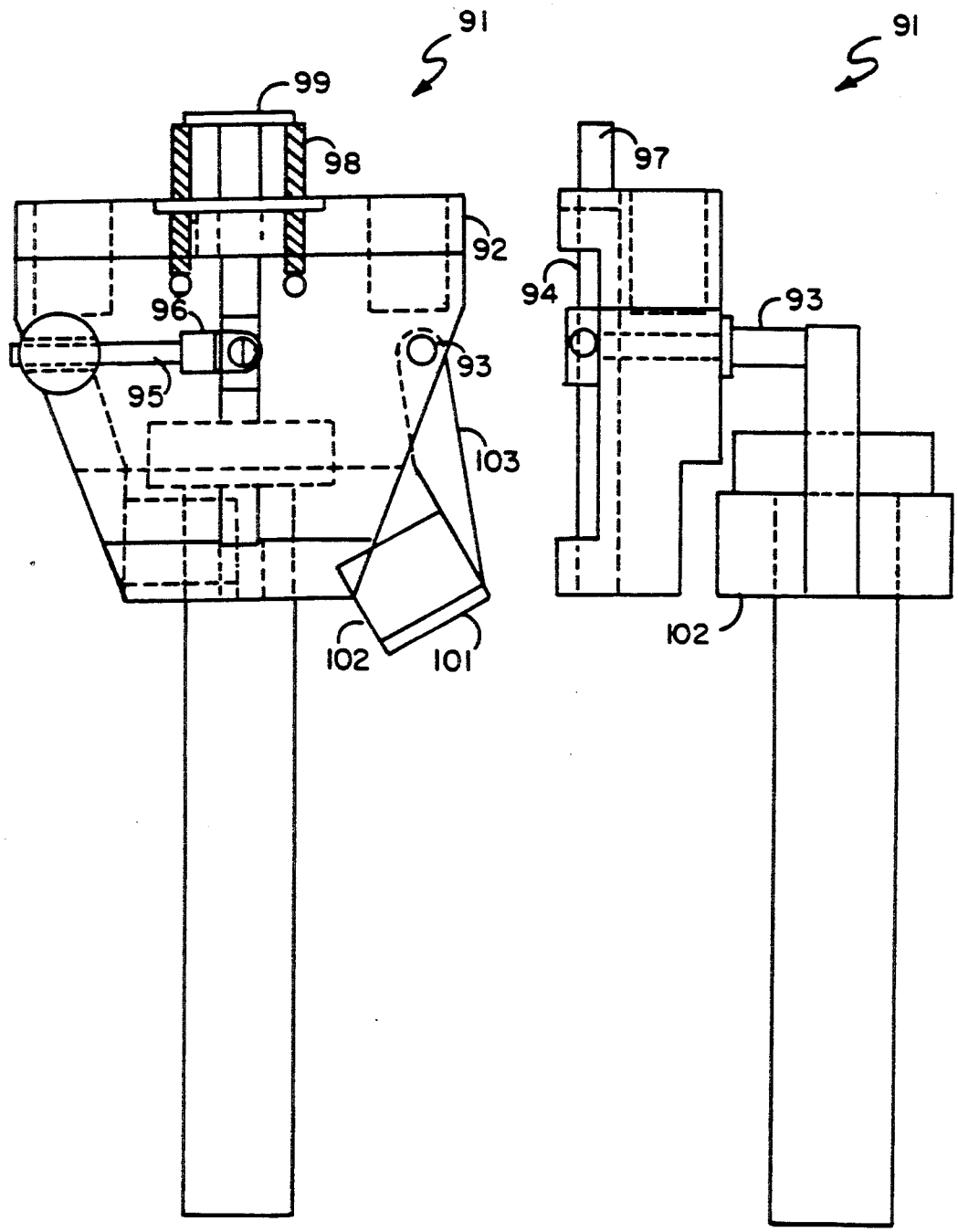
FIGS. 9A and 9B show two views of the split ferrule mechanism.
Figure 10A:
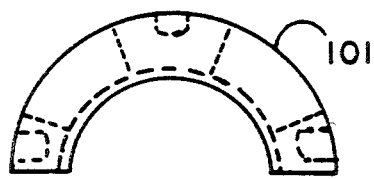
FIGS. 10A and 10B show two views of a split ferrule.
Figure 10C:
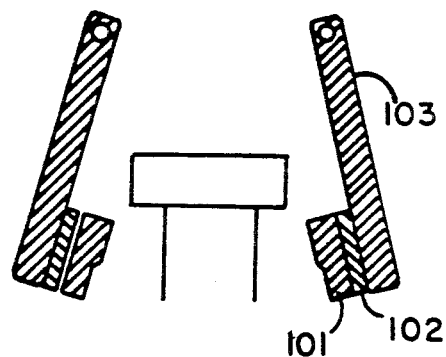
FIGS. 10C and 10D show two embodiments of a pivoted split ferrule holder.
Figure 10D:
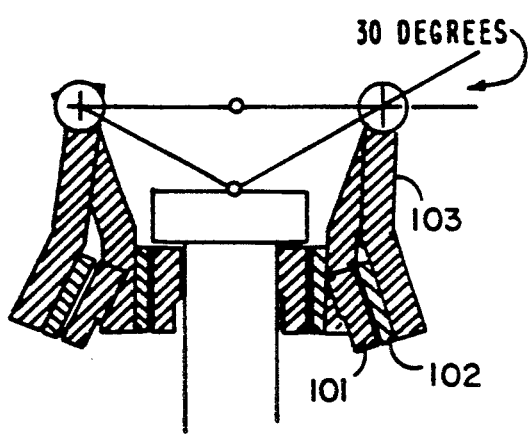
Figure 11:
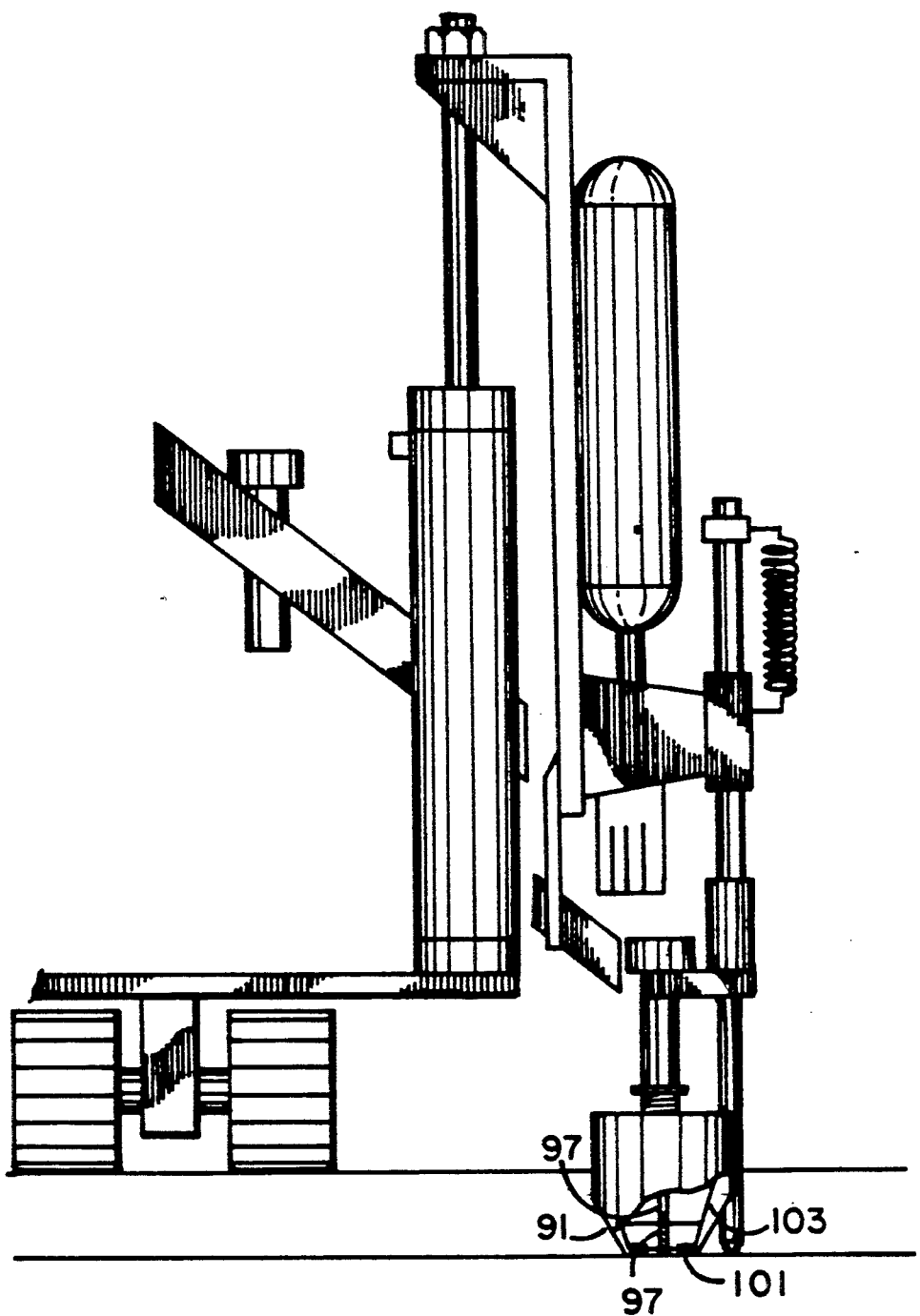
FIG. 11 shows a front elevation view of an embodiment of the invention that uses a split ferrule mechanism.

The split ferrule mechanism is shown in two views in FIGS. 9A and 9B. FIGS. 9A and 9B show split ferrule mechanism (91) mounted within chassis (92). Referring also to FIGS. 10A and 10D, pivot shafts (93) each carry a pivot arm (103), a split ferrule retainer (102) and a split ferrule (101). Shaft (93) is spring loaded by spring (98) operating against thrust rod head (99) so that the ferrule halves are normally held apart, clear of the stud as shown in FIG. 10C. Turning now to FIG. 11, thrust rod (97) on contacting the lower decking (11) moves up against spring (98) shown in FIG. 9A and, via sliding pivot (94), pivot head (96), and torque arm (95) causes rotation of pivot shafts (93) and pivot arm (103) inwardly towards the stud such that the ferrule halves (101) are brought together around the body of the stud as shown dotted in the left half of FIG. 9A.

Figure 10B:
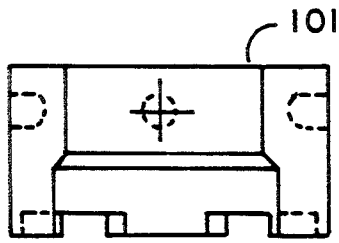

FIG. 10A and 10B show a top view and an elevation view of a split ferrule. FIGS. 10C and 10D show two embodiments of the pivot arm. FIG. 10D shows the preferred embodiment of the present invention.

Figure 12:
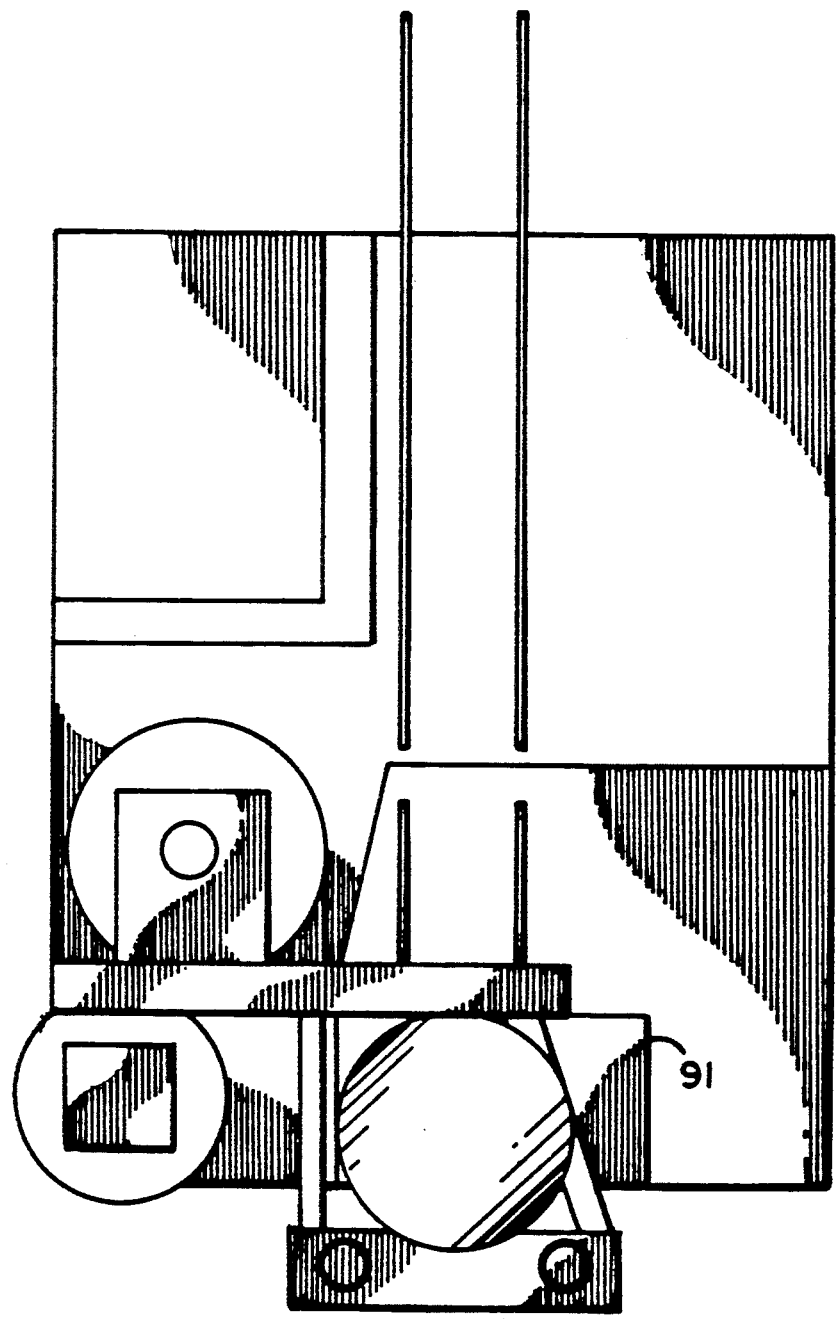
FIG. 12 shows a plan view of the embodiment of FIG. 11.

An elevation view of an embodiment of the present invention showing the location of the split ferrule mechanism (91) is shown in FIG. 11. FIG. 12 locates the split ferrule mechanism (91) in a plan view of the same embodiment.

What is claimed is:

1. A welding apparatus for welding shear studs onto weld sites on a substantially horizontal surface using ferrules as weld molds, comprising:
   a carriage, translatable along a surface;
   a weld module, including a frame and a welding gun having a chuck, the weld module translatably mounted to the carriage;
   holding means, mounted to the frame, for holding a stud in a first position, the first position spaced apart from the chuck and aligned between the chuck and the weld site, and for holding a ferrule in a second position, the second position spaced apart from the first position and aligned between the first position and the weld site; and
   drive means for driving the weld module downward such that the chuck may make contact with the stud and drive a lower portion of the stud into the ferrule and proximate to the weld site.

2. An apparatus according to claim 1, wherein the holding means includes means for supporting the stud yieldingly in the first position.

3. An apparatus according to claim 1, wherein the holding means includes a hinged platform for supporting the stud yieldingly in the first position.

4. An apparatus according to claim 3, further comprising magnetic means for holding the hinged platform in a loading position.

5. An apparatus according to claim 1, wherein the holding means includes a slideably mounted platform for supporting the stud yieldingly in the first position.

6. An apparatus according to claim 5, further comprising magnetic means for holding the slideably mounted platform in a loading position.

7. An apparatus according to claim 1, wherein the holding means includes a ferrule holder having a spring-loaded plunger for gripping a ferrule.

8. An apparatus according to claim 1, wherein the holding means includes a pivotally mounted ferrule holder.

9. An apparatus according to claim 1, wherein the carriage includes track means for enabling the carriage to travel over corrugated decking in any direction with respect to the corrugations.

10. An apparatus according to claim 1, wherein the drive means includes position sensor means for detecting when the holding means is positioned to hold a stud in the first position.

11. An apparatus according to claim 1, further including stud feed means, mounted to the carriage, for automatically feeding studs to the holding means.

12. An apparatus according to claim 11, wherein the stud feed means includes a pair of inclined rails capable of holding a row of studs, each stud being held between the rails and supported by its head, the lower end of the rails disposed proximate to the welding gun, and ratchet sequencer means, located proximate to the lower end of the rails, for allowing one stud at a time to slide off the lower end of the rails into a loading position, below the welding gun.

13. An apparatus according to claim 12, further comprising a stud tip orientation guide mounted below and inclined in a direction substantially parallel to the pair of inclined rails.

14. An apparatus according to claim 12, wherein the stud feed means further includes stud sensor means for detecting the presence of a stud proximate to the lower end of the rails.

15. An apparatus according to claim 12, wherein the weld module further includes intermediate /stud guide rails aligned below the lower end of the inclined rails when the weld module is in a loading position.

16. An apparatus according to claim 1, further including ferrule feed means for automatically feeding ferrules to the holding means.

17. An apparatus according to claim 16, wherein the ferrule feed means includes ferrule stack holder means for holding a stack of ferrules, ferrule ratchet sequencer means, disposed below the stack of ferrules, for allowing one ferrule at a time to fall out of the stack of ferrules, a pivotally mounted ferrule delivery arm having a pivot end and a free end, and a ferrule delivery scoop rigidly mounted on the free end so disposed that, when the arm is in a load position, the scoop is capable of receiving a ferrule released by the ferrule ratchet sequencer means.

18. An apparatus according to 17, wherein the ferrule ratchet sequencer means includes an upper blade pivotally mounted for rotation about a vertical axis, a lower blade pivotally mounted for rotation about a vertical axis, and actuation means for moving the blades from a hold position to a release position.

19. An apparatus according to claim 17, wherein the ferrule feed means further includes pneumatic cylinder means for operating the ferrule delivery arm.

20. An apparatus according to claim 17, wherein the ferrule stack holder means further includes ferrule sensor means for detecting the presence of a ferrule proximate to the lower end of the ferrule stack holder means.

21. An apparatus according to claim 17, wherein the ferrule stack holder further includes an inner vertical tube and an outer vertical tube, substantially concentric with each other and attached at the top, such that ferrules may occupy the space between the tubes.

22. An apparatus according to claim 21, wherein the ferrule stack holder means further includes ferrule retaining means for retaining a stack of ferrules such as to facilitate transportation of a ferrule stack holder means loaded with ferrules.

23. An apparatus according to claim 22, wherein the ferrule retaining means includes a pivoted lever having a nub at its lower end so disposed that, when the pivoted lever is in a locked position, the nub is capable of retaining the stack of ferrules.

24. An apparatus according to claim 1, wherein the holding means includes a reusable ferrule.

25. An apparatus according to claim 24, wherein the reusable ferrule has at least two parts and the at least two parts are mounted for pivotal retraction.

26. An apparatus according to claim 24, further including spring means for holding the at least two parts of the reusable ferrule apart and thrust rod means for bringing the at least two parts of the reusable ferrule together.

27. An apparatus according to claim 26, wherein the thrust rod means includes a rigid linkage.

28. A method for positioning a headed shear stud, a ferrule, and a welding gun having a chuck, in preparation for welding the headed shear stud onto a weld site on a substantially horizontal surface, comprising the steps of:
  holding a ferrule over the weld site;
  supporting a stud, with a force sufficient to support the weight of the stud, in an initial position above the ferrule;
  advancing the welding gun downward in a direction aligned with the stud and with the ferrule until the chuck contacts the head of the stud;
  holding the head of the stud in the chuck;
  overcoming the force supporting the stud in its initial position; and
  pushing the stud downward, from its initial position by means of the welding gun chuck, until the tip of the stud enters the ferrule.

29. A method according to claim 28, wherein the step of supporting a stud in its initial position includes supporting the stud magnetically.

30. A method according to claim 28, further comprising the step of removing the ferrule from the weld site for reuse.

* * * * *

UNITED STATES PATENT AND TRADEMARK OFFICE
CERTIFICATE OF CORRECTION

PATENT NO. : 5,130,510
DATED : July 14, 1992
INVENTOR(S) : Andrew Ziegler, et. al.

It is certified that error appears in the above-indentified patent and that said Letters Patent is hereby corrected as shown below:

On the Title page, item [75], inventor: delete Andrew Zeigler-- insert-- Andrew Ziegler--.

Signed and Sealed this

Seventh Day of September, 1993

*Attest:*

BRUCE LEHMAN

*Attesting Officer*     *Commissioner of Patents and Trademarks*